(12) United States Patent
Dalton

(10) Patent No.: US 9,782,781 B2
(45) Date of Patent: Oct. 10, 2017

(54) METHOD AND APPARATUS FOR RECYCLING LAMINATED WINDSHIELDS

(71) Applicant: James L. Dalton, East Hartford, CT (US)

(72) Inventor: James L. Dalton, East Hartford, CT (US)

(*) Notice: Subject to any disclaimer, the term of this patent is extended or adjusted under 35 U.S.C. 154(b) by 741 days.

(21) Appl. No.: 14/268,063

(22) Filed: May 2, 2014

(65) Prior Publication Data

US 2015/0314302 A1 Nov. 5, 2015

(51) Int. Cl.

| | |
|---|---|
| *B02C 23/20* | (2006.01) |
| *B03B 9/06* | (2006.01) |
| *B03B 5/02* | (2006.01) |
| *B02C 23/08* | (2006.01) |
| *B01F 11/00* | (2006.01) |
| *B03B 5/28* | (2006.01) |
| *B29B 17/02* | (2006.01) |
| *B09B 3/00* | (2006.01) |
| *B01F 15/06* | (2006.01) |
| *B29L 31/00* | (2006.01) |

(52) U.S. Cl.
CPC .......... *B03B 9/062* (2013.01); *B01F 11/0082* (2013.01); *B02C 23/08* (2013.01); *B02C 23/20* (2013.01); *B03B 5/02* (2013.01); *B03B 5/28* (2013.01); *B09B 3/00* (2013.01); *B29B 17/02* (2013.01); *B01F 2015/061* (2013.01); *B29B 2017/0217* (2013.01); *B29L 2031/7782* (2013.01); *Y02W 30/524* (2015.05); *Y02W 30/60* (2015.05); *Y02W 30/622* (2015.05)

(58) Field of Classification Search
CPC ..... B02C 23/08; B02C 23/20; B02C 19/0087; B29B 3/00; B03B 9/062
USPC .................. 241/60, 99, 24.22, 24.3
See application file for complete search history.

(56) References Cited

U.S. PATENT DOCUMENTS

| | | | | |
|---|---|---|---|---|
| 5,984,216 A | * | 11/1999 | Andela | ................. B03B 9/062 241/186.4 |
| 6,401,581 B1 | * | 6/2002 | Sand | ...................... C03B 37/16 241/60 |
| 6,502,424 B1 | | 1/2003 | Debailleul | |
| 7,931,220 B2 | * | 4/2011 | Grasso, Jr. | .............. B02C 17/22 241/152.2 |
| 2009/0261191 A1 | * | 10/2009 | Eriksen | ................ B02C 13/286 241/189.1 |

* cited by examiner

*Primary Examiner* — Faye Francis
(74) *Attorney, Agent, or Firm* — Alix, Yale & Ristas, LLP

(57) ABSTRACT

A method for separating glass from a laminate of glass and binder by breaking sheets of laminated glass into pieces; placing the pieces into a chamber with water; and then pressurizing the chamber, whereby the glass separates from binder; and removing the separated glass from the chamber. The separation can be enhanced by agitating and alternately pressurizing the chamber and freezing the water in the chamber.

5 Claims, 1 Drawing Sheet

METHOD AND APPARATUS FOR RECYCLING LAMINATED WINDSHIELDS

BACKGROUND

The present invention relates to a method for separating glass from a laminate of glass and binder.

Automobile windshields and other forms of so-called "safety glass" are typically a laminate of glass and binder. It is desirable that the glass and binder components of broken or otherwise unusable safety glass panels be separated and recovered for recycling. Laminated glass is designed to remain as a unitary part even when severely cracked, i.e., it does not break into pieces. The glass cracks and the binder holds the glass pieces together. In commercial recycling of laminated glass panels, the entire broken panel is placed in a separation chamber.

One known process for separating glass form binder is described in U.S. Pat. No. 6,502,424, "Process and Plant for Processing Interleaved Glass".

SUMMARY

The present invention is directed to a method for separating glass from a laminate of glass and binder, comprising the steps of breaking sheets of laminated glass into pieces; placing the pieces into a chamber with water; and then pressurizing the chamber, whereby the glass separates from binder; and removing the separated glass from the chamber.

The separation can be enhanced by alternately pressurizing the chamber and freezing the water in the chamber.

The process can be further enhanced by introducing air into the chamber, thereby speeding up the rise and consolidation of the binder over the glass, so substantially all of the binder can more easily be removed from the upper region of the chamber while the glass remains in the lower region of the chamber.

A system embodiment comprises a closed chamber containing pieces of laminate immersed; a compressor or the like operatively connected to the chamber for pressurizing the chamber; and shaker operatively connected to the chamber for the pieces in the chamber.

Preferably, a refrigeration unit is operatively associated with the chamber, for alternately freezing and thawing the water.

This process is completely ecologically friendly, as no chemicals are required. This avoids outlays for the purchase and disposition of chemicals. The process is simple, clean, and efficient. It can be used at any volume, from small batches to large commercial operations, with the same result.

BRIEF DESCRIPTION OF THE DRAWING

An embodiment will be described in greater detail with reference to the accompanying drawing, in which.

DETAILED DESCRIPTION

Figure 1:
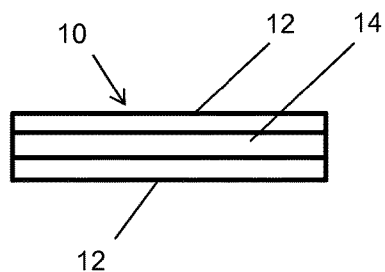
FIG. 1 is an end view a laminated glass panel.
Figure 2:
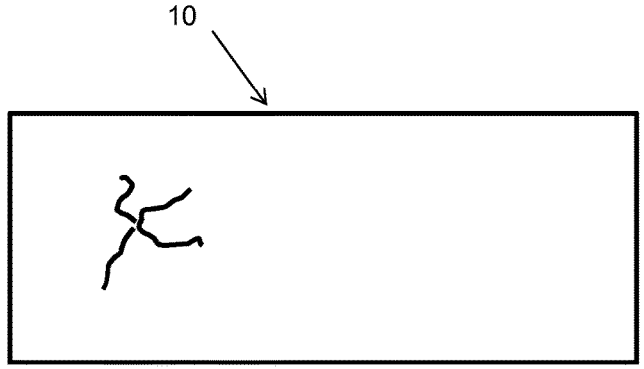
FIG. 2 is a plan view of the glass panel, showing cracks.

FIG. 1 shows an end view of a laminated glass panel or sheet 10, with alternating thin layers of glass 12 and binder 14. The binder is typically polyvinyl butyral (PVB) or other polymeric or plastic material. When the panel or sheet 10 is damaged as shown in FIG. 2 or otherwise to be discarded, the glass 12 and binder material 14 can be separated and recovered.

Figure 3:
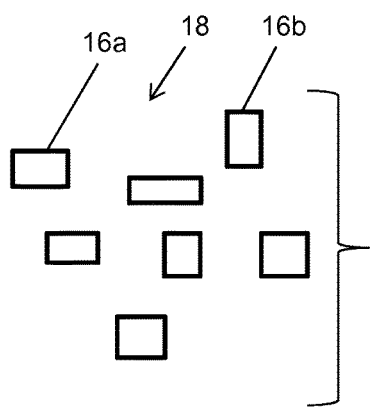
FIG. 3 is a schematic representation of the breaking up the cracked panel into a multiplicity of individual pieces.

As shown in FIG. 3, the first step is to break up the panel into smaller pieces such as 16a and 16b, and collect them as a batch 18 that can fit into a processing chamber. To some extent the larger the chamber the larger the pieces that can be accommodated, but in general the smaller the pieces the more efficient the process because more of the glass/binder interface will be exposed at the edges of the pieces. The breaking apart can include cutting, pulling, or shredding.

Figure 4:
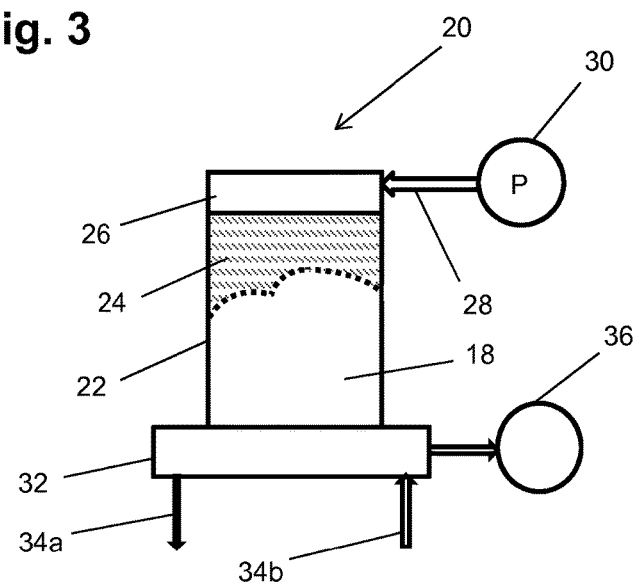
FIG. 4 is a schematic representation of the system for separating the glass from the binder.

The separation system and process 20 are represented in FIG. 4. The batch 18 of broken apart pieces is loaded as a pile into the pot 22 of processing chamber and the pile is covered with water 24. The chamber is sealed with cover 26 then pressurized via line 8 and pump or compressor 28, preferably with compressed air to over 40 psi, especially over 60 psi. The pot 22 can rest on a specially adapted shake table 32 by which the pressurized contents are preferably agitated, as by oppositely directed pistons 34a, 34b. Separation can also be accelerated by alternately pressurizing the chamber via line 28 and freezing the water in the chamber, for example with refrigeration system 36 associated with the table or another, surrounding chamber (not shown).

Since the binder has a density lower than the density of glass, the separated binder rises within the pot 22 to consolidate above the separated glass, which falls within the chamber. After substantially all the binder has separated from the glass, the chamber is depressurized, the cover 26 detached, and the binder removed, leaving separated glass for easy removal from the chamber. In a further preference, after the chamber is depressurized and the cover removed, an air jet can be introduced into the chamber, thereby facilitating the rise of the binder over the glass.

The opened chamber can be tilted to pour out the separated binder. This can be enhanced by adding more water to the chamber. Then the glass can be poured out. Each of the binder and the glass can then be recycled.

In a prototype example, approximately three pounds of five inch by five inch broken laminate was deposited in a three quart capacity pressure pot chamber and covered with 1.5 quarts of water. The chamber was pressurized to 60 psi and maintained at pressure for six weeks. No external heat was applied. During this period the contents were tumbled or otherwise agitated on a weekly basis and frozen/unfrozen several times.

The process parameters of pressure level, agitation rate and force, and cycles of freezing and thawing can all be increased to decrease the time required for complete separation of binder material from glass material.

The invention claimed is:

1. A method for separating glass from a laminate of glass and binder, comprising:
    breaking sheets of laminated glass into pieces;
    placing the pieces into a chamber with water;
    pressurizing the chamber, whereby glass separates from binder; and
    removing the separated glass from the chamber;
    wherein the pieces are covered in water in the chamber while the chamber is pressurized; and
    wherein separation is accelerated by alternately pressurizing the chamber and freezing the water in the chamber.

2. A method for separating glass from a laminate of glass and binder, comprising:

breaking sheets of laminated glass into pieces;
placing the pieces into a chamber with water;
pressurizing the chamber, whereby glass separates from the binder; and
removing the separated glass from the chamber;
wherein the pieces are covered in water in the chamber while the chamber is pressurized;
the binder has a density lower than the density of glass;
binder that has separated from glass within the chamber rises within the chamber to cover separated glass that falls within the chamber;
after substantially all the binder has separated from the glass, the chamber is depressurized, and the binder is removed, leaving separated glass in the chamber; and
the separated glass is removed from the chamber.

3. The method of claim 2, wherein after the chamber is depressurized,
the chamber is opened; and
air is introduced into the chamber, thereby furthering the rise of binder over the glass.

4. The method of claim 2, wherein after the chamber is depressurized,
the chamber is opened and tilted to pour out binder; and
water is introduced into the tilted chamber to enhance the pouring out of binder.

5. A method for separating glass from a laminate of glass and binder, comprising:
breaking sheets of laminated glass into pieces;
placing the pieces into a chamber with water;
pressurizing the chamber, whereby glass separates from the binder; and
removing the separated glass from the chamber;
wherein
the binder is polyvinyl butyral;
the pieces in the chamber are covered with water;
the chamber is pressurized to at least 40 psi for at least one week;
binder that has separated from glass within the chamber rises within the chamber to cover separated glass that falls within the chamber;
after substantially all the binder has separated from the glass, the chamber is depressurized, and the binder is removed, leaving separated glass in the chamber; and
the separated glass is removed from the chamber.

\* \* \* \* \*